United States Patent
Pijnenburg et al.

(10) Patent No.: US 6,169,842 B1
(45) Date of Patent: Jan. 2, 2001

(54) RECORDING AND REPRODUCING SYSTEM FOR SIMULTANEOUS RECORDING AND REPRODUCTION VIA AN INFORMATION CARRIER

(75) Inventors: Josephus A. Pijnenburg; Emmanuel D.L. Frimout, both of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 08/919,079

(22) Filed: Aug. 27, 1997

(30) Foreign Application Priority Data

Sep. 16, 1996 (EP) .................................................. 96202586

(51) Int. Cl.$^7$ ...................................................... H04N 5/91
(52) U.S. Cl. .............................. 386/46; 386/35; 386/109; 386/125
(58) Field of Search ...................................... 386/125–126, 386/109, 46, 112, 68, 70, 82, 35; 348/714; 360/8, 86; 369/60

(56) References Cited

U.S. PATENT DOCUMENTS

| | | | |
|---|---|---|---|
| 5,371,551 | * 12/1994 | Logan et al. .......................... | 386/112 |
| 5,463,607 | * 10/1995 | Roth et al. .............................. | 369/60 |
| 5,627,809 | * 5/1997 | Honjo ...................................... | 369/47 |
| 5,687,150 | * 11/1997 | Nonaka et al. .......................... | 369/60 |
| 5,930,444 | * 7/1999 | Camhi et al. ........................... | 386/125 |
| 6,002,832 | * 12/1999 | Yoneda ................................... | 386/125 |
| 6,018,612 | * 1/2000 | Thomason et al. .................... | 386/125 |

FOREIGN PATENT DOCUMENTS

| | | |
|---|---|---|
| 0594241A1 | 4/1994 | (EP) . |
| 0644691A2 A3 | * 3/1995 | (EP) ............................... H04N 5/92 |
| 07141774 | 6/1995 | (JP) . |
| 08046907 | 2/1996 | (JP) . |

* cited by examiner

Primary Examiner—Wendy Garber
Assistant Examiner—Vincent F. Boccio
(74) Attorney, Agent, or Firm—Michael E. Belk

(57) ABSTRACT

A recording and reproducing system for recording a first information flow on an information carrier and simultaneously processing a further information flow via the information carrier. The system includes a reading/writing unit for alternately writing and reading information on the information carrier, and a buffer for buffering information during recording and/or reproduction. The system includes a controller for controlling the recording of the first information flow depending on a data rate required for processing the further information flow. The system may also include a controllable compression means or a controllable transcoder. At a certain transmission rate of the system, the available data rate can be used to more advantage during recording, while there is always a minimum data rate available for recording in the simultaneous reproduction/recording mode.

9 Claims, 4 Drawing Sheets

RECORDING AND REPRODUCING SYSTEM FOR SIMULTANEOUS RECORDING AND REPRODUCTION VIA AN INFORMATION CARRIER

FIELD OF THE INVENTION

The invention relates to the field of information recording and playing systems.

BACKGROUND OF THE INVENTION

The invention relates to a recording and reproducing system for recording a first information flow on an information carrier and simultaneously processing a further information flow via the information carrier, the system comprising a reading/writing unit for scanning the information carrier with the scanning velocity either for writing or reading information on the information carrier, and buffer means for buffering information during recording and/or reproduction.

Such a recording and reproducing system is disclosed in EP 0594241 (PHN 14.217). The system comprises a random-access main memory for storing information, such as a disc memory. Via an input buffer memory the input of the main memory is coupled to an input for receiving an information flow. The information flow represents a continuous-time signal, for example, a video signal after digitization and compression. The output of the main memory is coupled to an output via an output buffer memory. In the example the information flow is reproduced on the output and can be reconverted into the video signal by decompression. The system comprises a read/write head for reading information from the disc memory and writing the information in the disc memory, and a system control for alternately reading and writing, so that, in operation, the input buffer is kept substantially empty and the output buffer is kept substantially full. With such a system for video signals, a video program can be reproduced with a short or long delay, while the program itself has not terminated yet. A user may start watching a partly recorded program, while at the same time a remaining part of the program is being recorded. Alternatively, if the user's direct viewing of a video program is interrupted, for example, due to a telephone call, with the system may start the recording and later continue viewing without any loss after the interruption.

The above citations are hereby incorporated in whole by reference.

SUMMARY OF THE INVENTION

A problem of the above system is that it is arranged for a fixed recording process.

It is an object of the invention to provide a recording and reproducing system in which the recording and/or the reproduction is provided more efficiently. For this purpose, the system according to the invention is characterized in that the system comprises control means for controlling the recording of the first information flow depending on a required data rate for processing the further information flow. This provides the advantage that the recording may be adapted depending on the circumstances, such as current or expected future simultaneous recording and reproduction. As a result, the largest possible part of the transmission capacity of the system is utilized, so that the transmission capacity of the system is spread over writing and reading in a well balanced manner. In order to have sufficient writing capacity available for future simultaneous recording/reproduction, the current recording is adapted for current simultaneous recording/reproduction, and the transmission capacity is optimally utilized. This is all the more an advantage compared to a higher tranmission capacity less efficiently used, because the higher transmission capacity would make a system more complex and sensitive to wear and defects. A higher and/or more stable quality of the reproduced signal is provided with the available transmission capacity.

An embodiment of the recording and reproducing system according to the invention is characterized in that the system includes compression means for controllably compressing the first information flow during recording, and in that the control means are arranged for controlling the compression means depending on the required data rate. This is advantageous because the degree of compression is adapted to the required data rate and, consequently, as much as possible the available bits are used, so that the signal is compressed the least possible and provides high quality reproduction. This is particularly advantageous for information flows that have a variable bit rate, such as MPEG-2 digital video. Further embodiments of the recording and reproducing system according to the invention and advantages hereof are described in dependent claims and the explanation that follows.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENT

Figure 1:
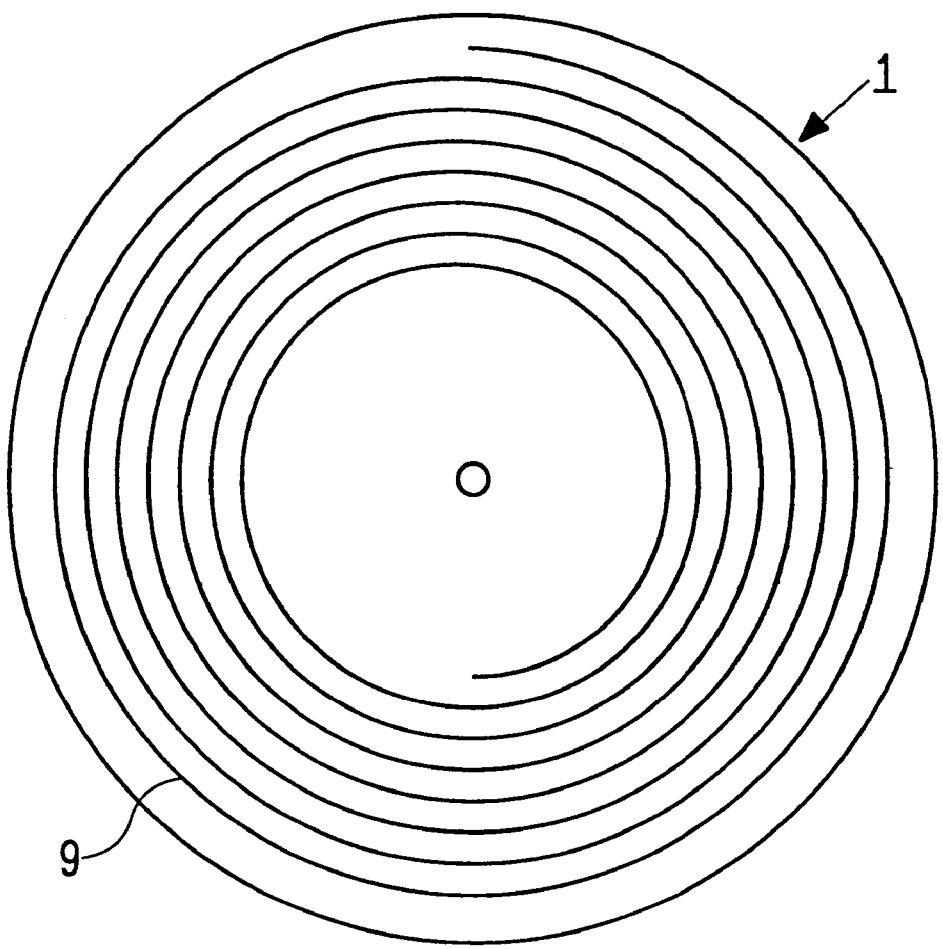
FIG. 1 shows an information carrier of a writable type.

In the Figures, elements corresponding to elements already described carry like reference numerals.

FIG. 1 shows a disc-shaped information carrier 1 of a rewritable type such as, for example, a CD-E (Compact Disc Erasable). The information carrier includes a track 9 intended for recording, which is arranged according to a helical pattern of windings. The windings may also be arranged concentrically in lieu of helically. Track 9 is indicated on the information carrier by a servo pattern in which, for example, a pregroove enables a read/write head to follow track 9 during the scanning operation. Furthermore, the servo pattern may contain information about the position along the track such as, for example, a time indication from the beginning of the track. The information carrier has a recording layer which can be written in optical or magneto-optical manner by a system for writing information blocks in the form of patterns of marks. The CD-E has, for example, a recording layer of phase-change material. A description of the recording and reading of a CD and the use of a track and pregroove may be found in the title "Principles of optical disc systems" by Bouwhuis et al., ISBN 0-85274-785-3 incorporated herein in whole by reference. The invention may also be applied to other disc-shaped rewritable information carriers such as, for example, magnetic hard disks, or to information carriers of different form for which writing and reading in separate areas of the information carrier can be alternated rapidly, such as optical tape.

Figure 2:
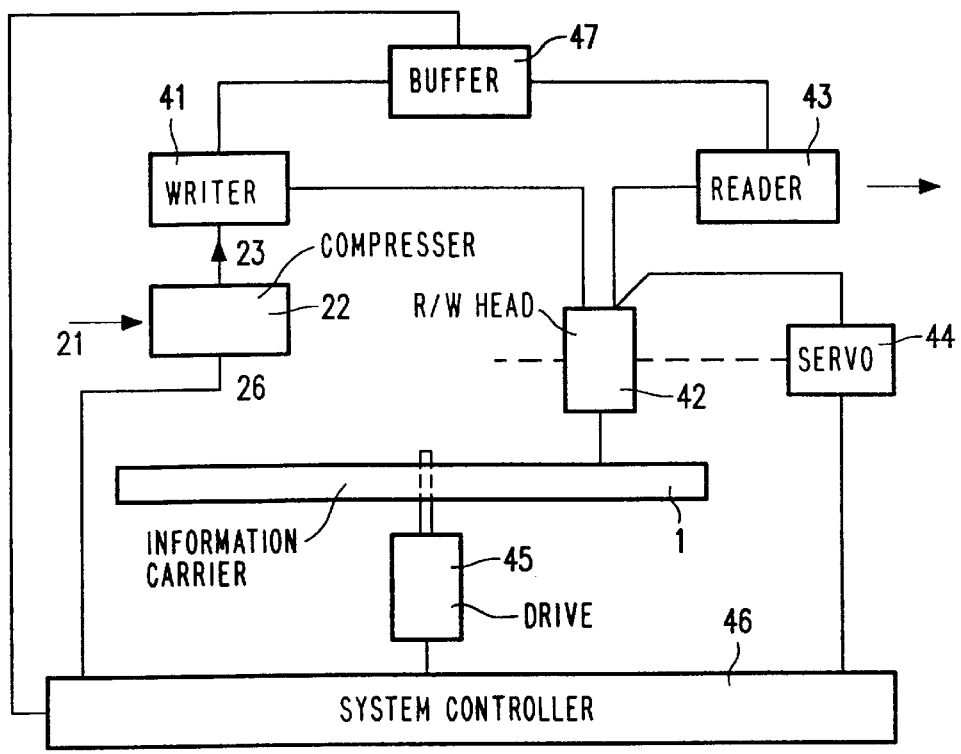
FIG. 2 shows a recording and reproducing system including controllable compression means.
Figure 4:
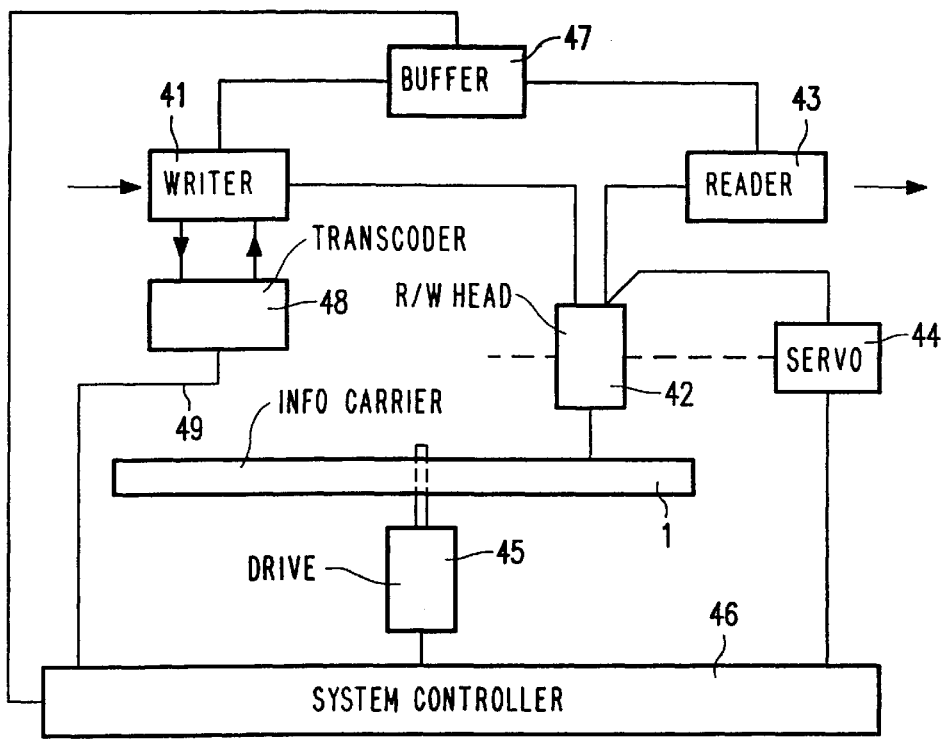
FIG. 4 shows a recording and reproducing system including a transcoder.
Figure 5:
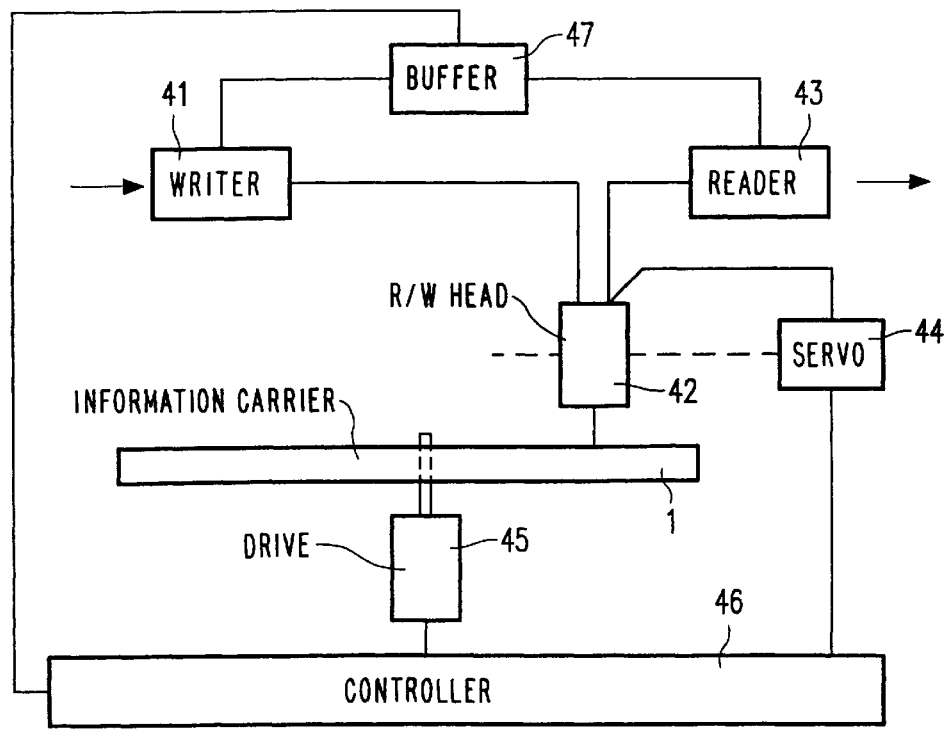
FIG. 5 shows a recording and reproducing system including adapted control means.

FIGS. 2, 4 and 5 show recording and reproducing systems for recording a first information flow on a disc-shaped information carrier and simultaneously processing a further information flow via the information carrier which, for example, can be written magneto-optically or optically (via phase change material). The system includes driving apparatus 45 for causing the information carrier 1 to rotate and read/write head 42 for scanning track 9, on the information carrier, for example, by a servo pattern for generating servo signals. Read/write head 42 is positioned in the radial direction over the track by servo means 44. Read/write head 42 scans the track with known tracking and focusing methods. The information applied to the input of writing apparatus 41 is split up into blocks in writing apparatus 41, as required, and converted into a write signal for read/write head 42. Writing apparatus 41 includes, for example, an error coder and a channel coder. When read, the signal of read/write head 42 is reconverted into information in reading apparatus 43 which includes, for example, a channel decoder and an error corrector. The system comprises buffer apparatus 47 for buffering via the writing means 41, information which is applied to the input during writing, and/or for buffering, via reading apparatus 43, information which is meant for the output during reading. The system further includes system control 46 which controls drive apparatus 45, servo means 44, writing apparatus 41, reading apparatus 43 and the buffer apparatus 47 and is arranged for executing the procedures to be described hereinafter.

Simultaneous recording and reproduction is provided by the system control 46 in the following manner. Read/write head 42 alternately reads and writes in two separate areas on the information carrier. A first information flow on the input is conveyed through buffer apparatus 47 and the information is written in a first area, while a second information flow can be produced on the output by conveying the information read from a second area of the information carrier 1 to the output through buffer apparatus 47. The information flows represent continuous-time signals, such as, audio or video. Patent Specification EP 0594241 describes a system and an embodiment for such a procedure in which the use of the buffer is improved. However, this procedure requires a system that has a sufficiently high transmission rate. A high transmission rate, however, has a significant effect on the complexity and the cost price of the system and, moreover, leads to greater sensitivity to wear and ageing of the system and defects on the information carrier.

Operating the system according to the invention may be presented to the user in a simple manner by using concepts of functions used by a VCR (Video Cassette Recorder). The system has keys labeled "Pause", "Resume", "Fast Forward" and "Backward". When watching a television program, the user may be called away. The "Pause" key then results in the start of a recording. On his return, the user presses "Resume", so that simultaneously reproduction (from the moment of being called away) starts and recording continues. When a commercial is shown then, the user presses "Fast Forward" so that the commercial is reproduced in the fast mode or is (partly) skipped. An indicator on the system may then indicate how much time the user still lags behind for the live broadcast, while at regular intervals a picture is reproduced in a small format. With other operating functions it is possible to make a direct leap ahead in time. After "Fast Forward" for a rather long period of time, the lagged time has fallen back to zero and the user again watches the broadcast live and the recording may be stopped. The system may always or on request be switched to the recording mode while the user is watching a program. There is then the possibility of repeating a part via the "Backward" key, for example, a goal in a soccer match, while the match is continued to be recorded.

Figure 3:
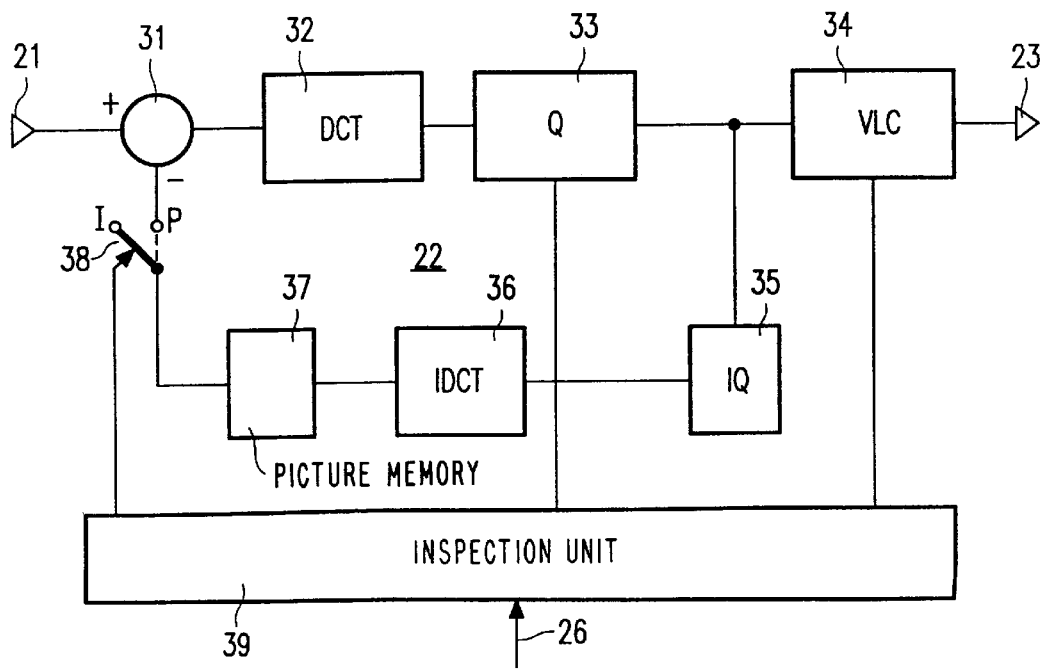
FIG. 3 shows a compression unit.

FIG. 2 shows a recording and reproducing system according to the invention which includes a controllable compression apparatus. The system includes compression unit 22 for reducing the data rate of an input signal depending on the information represented by the input signal. For example, redundancy in the representation may be reduced thereby or a less accurate representation may be generated with a slight loss of quality of a reproduced signal. The input signal is applied to input 21 and converted in compression unit 22 into a compressed signal which is subsequently converted into a writing signal in writing unit 41. Compression unit 22 is controllable via control input 26, so that a compression ratio between the data rate on input 21 and on output 23 can be adapted. A simple embodiment of such a controllable compression unit for audio will omit, as required, several less significant bits, for example, reduce a 16 bits per sample audio signal to 15 or 14 bits per sample. The system may include means for analog/digital conversion for converting an analog input signal into digital form. On the output, the system may include decompression means and/or digital/analog converting means. A signal may also be compressed depending on signal contents, similar to DCC or MPEG audio or video compression, of which FIG. 3 shows an embodiment. System control 46 is arranged for controlling the compression unit depending on the required data rate which is derived as described below with reference to FIG. 6. The data rate available for the recording is directly derived from the required data rate and the available transmission rate of the system. The compression apparatus are set so that the compressed signal does not exceed the available data rate. Not the instantaneous value, but the average value over a brief period is decisive here, because instantaneous variations are smoothed by buffer apparatus 47. This average value can be determined from the data rates or indirectly derived from the store fill of buffer apparatus 47.

FIG. 3 shows a compression unit for video information as is customary for MPEG2 known from ISO/IEC-13818-2 incorporated herein in whole by reference. A digital video signal is applied to input 21 and led via difference unit 31 to DCT unit 32 which performs a Discrete Cosine Transform in which the picture is subdivided into macroblocks. The coefficients obtained are led to Q-unit 33 and quantized with an adjustable dividing factor for which the bits of the quotient are further processed and the rest is discarded. The quotient bits are led to VLC unit 34 which codes the quotients which have variable lengths. In this manner, a coded picture signal having a variable bit rate is produced on output 23. The average bit rate may be influenced by inspection unit 39, for example, by setting the dividing factor in the Q-unit. A larger dividing factor resulting in a lower bit rate. Customary dividing factors lie between 2 and 16. A further reduction of the bit rate required for a specific picture quality, is obtained by transmitting each time a group of pictures (GOP), various difference pictures such as advance predicted P-pictures or bidirectionally predicted B-pictures being transmitted after an independent I-picture. Based on the activity found in the reproduced pictures, the inspection unit 39 decides which picture type is generated.

FIG. 3 shows a switch 38 controlled by the inspection unit 39. The switch does not allow information to pass for an I-picture and does allow the stored information of a reconstructed picture based on the coded signal to pass for a P-picture. The difference picture is then determined in difference unit 31 in which compensation for movement can also be used. A reconstructed picture, as is also formed in a receiving system, is formed via the IQ unit (Inverse Quantization), the IDCT unit (Inverse Discrete Cosine Transform) in a picture memory 37. By the selection of I, B and P pictures, the inspection unit 39 has a further influence on the bit rate. A customary criterion is then, for example, the maximum instantaneous bit rate which is to be lower than the transmission capacity of the transport channel and a short-term average. The values of the maximum instantaneous bit rate are to remain so low that the buffer capacity in a receiving system is not exceeded.

In such a compression unit having a variable bit rate, the quantity of generated data depends on the contents of the received signal. Compared with a constant bit rate system, a higher average quality of a reconstructed signal is obtained with the same total quantity of generated data. According to the invention, the average bit rate can be controlled by parameter setting via control input 26 of inspection unit 39. The long-term average bit rate is influenced via control input 26, for example, because the inspection unit adjusts the dividing factor or the selection of I/P/B pictures. Alternatively, It is possible for a certain preprocessing to be applied (not shown in FIG. 3), such as noise filtering or the reduction of the spatial frequency contents, for which the filter parameters may then be adjusted for influencing the bit rate.

FIG. 4 shows a recording and reproducing system according to the invention including a transcoder 48. The writing unit 41 has an input for receiving an input signal which may already be compressed according to certain compression rules. An example of this is an MPEG2 compressed video signal which is received, for example, via a satellite or cable network and applied to the recording and reproducing system. The transcoder 48 is arranged for further compressing such a signal which has already been compressed according to certain compression rules. A transcoder may include, for example, a cascaded decompression unit and compression unit as shown in FIG. 3. Complementary operations may then be combined. A description of such a transcoder may be found in EP 0 690 392 (PHF 94.001) incorporated herein in whole by reference. Transcoder 48 can be controlled via control signal 49 coming from control apparatus 50 for determining the degree of further compression. Transcoder 48 is coupled to writing apparatus 41 and receives an already compressed signal and returns a signal that is compressed even further, as required. The degree of compression is controlled depending on the required data rate in accordance with the control of compression unit 22 of FIG. 2.

FIG. 5 shows a recording and reproducing system according to the invention including control apparatus 51 for adjusting the scanning rate depending on the required data rate. In this embodiment of the system, control apparatus 51 include apparatus 52 for adjusting the transmission capacity. Depending on a currently required data rate (see FIG. 6c), the transmission capacity is temporarily increased, for example, because the system control establishes that buffer apparatus 47 become too full. For this purpose, the scanning velocity may be increased by a higher transport/rotation velocity of the information carrier. Reading will then take place at a proportionally faster velocity. In addition, the write clock rate can be increased, possibly in proportion to the scanning velocity. The faster reading and/or writing increases by signal 53 the transmission capacity of the system, causing a higher data rate to be developed for the information flow to be recorded. At a later instant, when the buffer is again empty enough, the transmission rate may be reduced to the normal value. In another embodiment there may be decided in favor in an increase of the transmission rate for other reasons, such as a desired reproduction quality, or always from the moment when two information flows are to be processed simultaneously. Advantageously, the scanning velocity is only increased if it is really necessary, because this will reduce wear, power consumption and/or heat development of the system.

In another embodiment of the system (see FIG. 4), the control apparatus 51 include apparatus 52 for selecting the radial position of an area for writing information of the first information flow depending on the required data rate. With a CD, it is customary to write information with a constant density and, therefore, a constant linear velocity (CLV). When reading and writing are alternated during simultaneous recording/reproduction, the rotation velocity, however, will not be adapted or only to a minor extent in accordance with the radial position, since a fast adaptation would require a very powerful driving motor. A rotation velocity midway between the velocities corresponding with the areas to be written or read may be selected, or a rotation velocity corresponding to the most inward area, while the more outward area is then scanned faster than the nominal velocity. For example, the system control according to the invention selects an area along the outside edge of the information carrier for writing a first information flow. At a later instant, when a further information flow is recorded and this recorded area is reproduced simultaneously, it is possible to write further to the center of the disc. If the recording process is effected with the nominal scanning velocity, the area along the outer edge will be read out with a higher scanning velocity. It is then advantageous that the servo apparatus need not be arranged for a high scanning velocity near the center of the disc, which high scanning velocity would be necessary if at a random radial position on the disc reading and/or writing were to be effected with increased scanning velocity. This would require a distinctly higher rotation velocity for areas lying more inwardly than with the same scanning velocity in an area along the outer edge of the disc. In addition, it is advantageous for the writing process always to be effected with the nominal velocity or at least a lower velocity than the reading velocity, since the quality of the writing mostly depends on the velocity and complex controls are necessary for the parameters of the writing process. Further, when areas are selected for recordings, the reproduction areas may be taken into account so that the distance to be bridged when reading is alternated by writing is not too large, because the displacement of read/write head 42 is dead time. If the first recording is effected from the outer edge toward the center of the disc, during simultaneous reproduction a second recording may be started, for example, from the middle between outer and inner diameter of the disc area intended for recording. During long-term simultaneous recording and reproduction, both the reproduction area and the recording area will slowly move inward, so that the mutual distance continues to be limited.

FIG. 6 gives a diagrammatic representation of the possible variation with respect to time of the data rate for recording and/or reproduction in a system according to the invention. The control means of the system are arranged for determining a required data rate and controlling the recording in dependence thereon. The graphs show the time t along a t-axis in horizontal direction and the data rate d in vertical direction. The graphs are based on a system according to the invention, which has a certain transmission capacity i.e. the sum of the average number of read and written bits per time unit for alternating writing and reading, indicated by a broken line 10. The recording of the first information flow is shown from the bottom upwards from the t-axis, whereas the data rate necessary for reproducing a further information flow is plotted from the available transmission capacity 10 downwards. The curves must not overlap, because then the available transmission capacity would be exceeded. The diagrammatic representation, however, does not show the necessary margin for switching between reading and writing. This margin depends on the parameters of the respective system, such as, the displacement time of a reading/writing unit and the buffer size. Furthermore, there is observed that it is alternatively possible to simultaneously record a further information flow instead of reproducing same, two signals then being recorded independently in separate areas. This is an advantage, for example, if the user wishes to record two television programs whose broadcast times partly overlap. The two recordings can be reproduced totally independently at a later instant or be erased or overwritten.

Figure 6A:
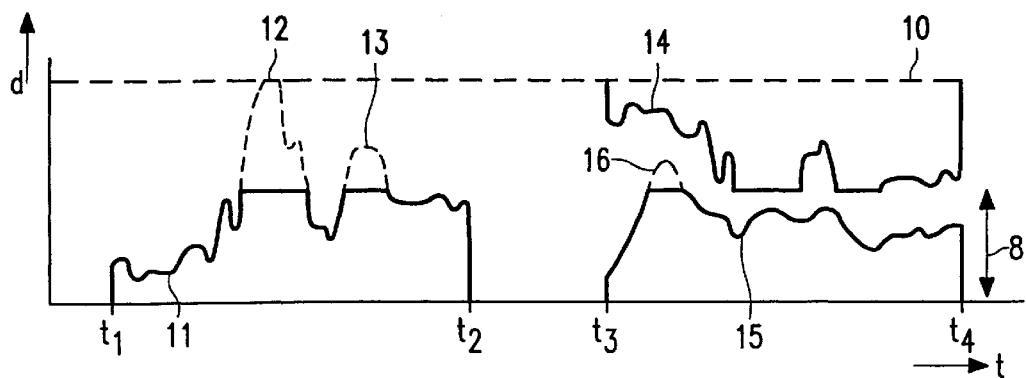
FIG. 6 shows in diagrams the curves of the data rate.

FIG. 6a first shows the recording of the signal between instants t1 and t2 at a data rate expressed in a curve 11 which includes the peaks 12, 13, which signal has a variable bit rate, such as, for example, an MPEG2 video signal. Then, between the instants t3 and t4, a further information flow is simultaneously recorded, indicated by curves 15 and 16, and the further information flow is reproduced as shown by curve 14. During the recording between t1 and t2, the system could store the signal unaltered, the maximum writing velocity being reached, for example, at the peak 12. However, during recording/reproduction between t3 and t4, this could lead to the available data rate for recording the further information flow 15 to drop to zero, which would lead to an unacceptable loss of quality or signal interruption during reproduction. During recording between t1 and t2, the data rate is therefore restricted by restricting, during the peaks 12 and 13, the data rate according to curve 11 to half the transmission capacity. A future required recording data rate between t3 and t4 during simultaneous reproduction is then set to 50% of the total transmission capacity. Obviously, it is also possible to accept a lower required data rate, for example, 45% or 30%. In that case there is a slightly greater chance that the further information flow is to be reduced strongly during simultaneous recording and reproduction, while there is still an acceptable quality available produced by the minimum available 30% or 45%. In contrast, during the recording of the first information flow between t1 and t2, a less strong compression is needed, in this example up to 55% or 70%. The choice of the future required data rate may be attuned to the properties of the signals to be recorded, an optimum being chosen between the less strong compression of the signal currently to be recorded and the risk of stronger compression of a signal possibly to be recorded in the future.

Also during simultaneous recording and reproduction between t3 and t4, the future required data rate may be taken into account again when recording. In that case, the data rate will be restricted during peak 16.

Figure 6B:
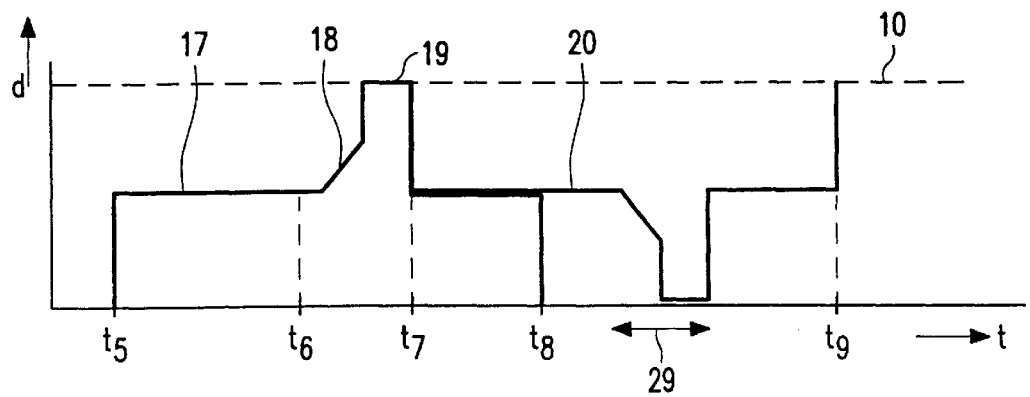

FIG. 6b shows the recording of a first information flow which has a predetermined time duration from t5 to t8, while a required data rate as for FIG. 6a is taken into account. The received signal now has a fixed data rate which from t5 to t6 is reduced to about 50% of the transmission capacity. After an instant t6, which lies between t5 and t8, the expectation is taken into account that simultaneous recording and reproduction will no longer take place. This may be inferred from the following calculation. If the user starts the reproduction mode, whereas the program has not completely terminated, for example, at instant t7 after t6, he will first watch the part that is recorded, but not yet reproduced. In this period the recording is continued, thus a time period t7–t5 is available for simultaneous recording and reproduction. If reproduction starts at t7 after half t8–t5, the part already recorded t7–t5 extends to beyond t8 and from the instant t6 onward, midway between t5 and t8, the recording may be effected at the full data rate 19. Obviously, this rate is again reduced to 50% after reproduction is-started from t7 onwards. Since the user may also decide to skip part of the recording during reproduction, for example, a commercial in a recorded film, the expected future required data rate may be reduced with a slight delay and in certain steps denoted 18. The program may also overrun its time, so that t8 is to shift. This may be indicated by the respective source, such as by the PDC system (Program Delivery Code) in which a television transmitter co-transmits time information relating to modified start and end times. During reproduction, the data rate obviously corresponds to the recording, while an additional data rate and, therefore, a higher quality of the reproduced signal is available during the time interval 29 which corresponds to t6–t7.

The expectation about the actual simultaneous recording and reproduction at a later instant may also be derived from other details, such as, for example, from the part of the day in which the later instant will occur. The system has a day/date clock as is customary in a VCR. Reproduction after midnight, for example, is less likely, especially on a working day. The system may also utilize experience data about the user's watching behavior. A general average may then be used or the system may intelligently derive its data from the user's real actions. If simultaneous recording and reproduction at a later instant is less likely, a lower required data rate can be selected while yet a minimum data rate is available. In the unlikely event that yet reproduction and recording are to take place simultaneously, a recording will be possible indeed, but with a limited quality.

Figure 6C:
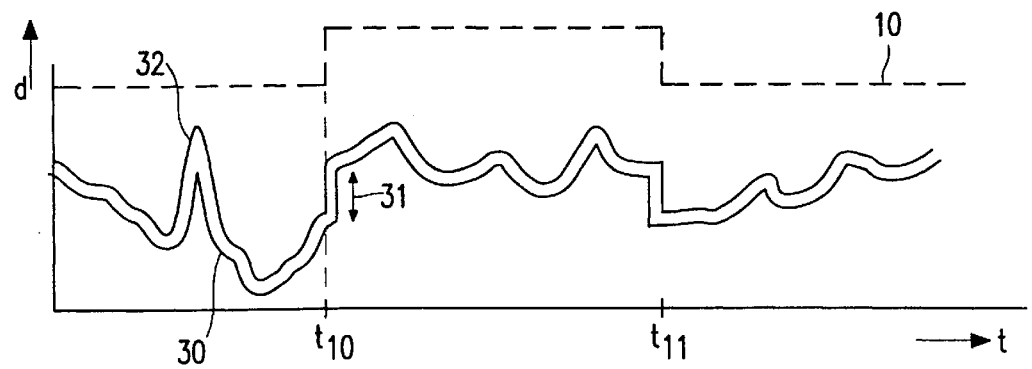

FIG. 6c shows the reproduction of an already recorded information flow at a data rate according to curve 32 (from the transmission capacity 10 downwards), and simultaneous recording of an input information flow. The currently required data rate is derived from the data rate necessary for reproducing the already recorded information flow. The currently required data rate is subtracted from the transmission capacity and, as a result, a remaining data rate shown by curve 30 is available for recording the input information flow. It is advantageous to utilize this remaining data rate as much as possible for recording, for example, by adapting the compression ratio in the controllable compression means as described above. Also the transmission capacity can be adapted as described with reference to FIG. 5. From instant t10 onwards, the transmission capacity is increased temporarily, so that additional data rate 31 is available for the information flow to be recorded. At instant t11, the transmission rate may be reduced to the normal value, for example, when the buffer has become sufficiently empty.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A recording and reproducing system, comprising:

a reading/writing unit for scanning the information carrier with a scanning velocity either for writing or reading information on the information carrier;

buffer means for buffering information during recording and reproduction and;

control means for controlling the recording of a first information flow depending on a required future data rate for simultaneously processing further information flow, the recording including writing information on the information carrier and the further processing including reading or writing information on the information carrier, wherein the required future data rate is to be available for recording the further information flow at a later instant while the recorded first information flow is simultaneously reproduced, and depends on an expectation about actual simultaneous recording while the recorded first information flow is reproduced at the later instant.

2. The system of claim 1, in which the control means are means for determining the expectation depending on a remaining time period for recording and a time period of a recorded, but not reproduced, part of the first information flow.

3. The system of claim 1 in which the control means are means for controlling the scanning velocity for recording the first information flow depending on the required data rate for simultaneously processing the further information flow.

4. A recording and reproducing system, comprising:

a reading/writing unit for scanning the information carrier with a scanning velocity either for writing or reading information on the information carrier;

buffer means for buffering information during recording and reproduction and;

control means for controlling the recording of a first information flow depending on a required data rate for simultaneously processing further information flow, the recording including writing information on the information carrier and the further processing including reading or writing information on the information carrier, wherein the system further comprises compression means for controllably compressing the first information flow during recording; and in which the control means are means for controlling the compression means depending on the required data rate.

5. The system of claim 4, in which the compression means include a transcoder for additionally compressing, according to predefined compression rules, a first information flow already compressed according to the compression rules.

6. A recording and reproducing system, comprising:

a reading/writing unit for scanning the information carrier with a scanning velocity either for writing or reading information on the information carrier;

buffer means for buffering information during recording and reproduction and;

control means for controlling the recording of a first information flow depending on a required data rate for simultaneously processing further information flow, the recording including writing information on the information carrier and the further processing including reading or writing information on the information carrier, in which:

the information carrier is disc-shaped; and the control means are means for selecting the radial position of an area for writing information of the first information flow depending on the require data rate.

7. A recording and reproducing system, comprising:

a reading/writing unit for scanning the information carrier with a scanning velocity either for writing or reading information on the information carrier;

buffer means for buffering information during recording and reproduction and;

control means for controlling the recording of a first information flow depending on a required data rate for simultaneously processing further information flow, the recording including writing information on the information carrier and the further processing including reading or writing information on the information carrier, in which:

the required data rate is a future required data rate for which is to be available for recording the further information flow at a later instant while the recorded first information flow is simultaneously reproduced at that instant;

the further required data rate depends on an expectation about actual simultaneous recording while the recorded first information flow is reproduced at the later instant;

the control means are means for determining the expectation depending on a remaining time period for recording and a time period of a recorded, but not reproduced, part of the first information flow;

the system further comprises compression means for controllably compressing the first information flow during recording;

the control means are means for controlling the compression means depending on the required data rate;

the compression means include a transcoder for additionally compressing, according to predefined compression rules, a first information flow already compressed according to the compression rules;

the control means are means for controlling the scanning velocity depending on the required data rate;

the information carrier is disc-shaped; and the control means are means for selecting the radial position of an area for writing information of the first information flow depending on the required data rate.

8. A recording and reproducing system, comprising:

a reading/writing unit for scanning the information carrier with a scanning velocity either for writing or reading information on the information carrier;

buffer means for buffering information during recording and reproduction;

control means for controlling the recording of a first information flow depending on a required current data rate for simultaneously processing further information flow, the recording including writing information on the information carrier and the further processing including reading or writing information on the information carrier, in which:

the required data rate is a currently required data rate for an information flow to be reproduced or recorded simultaneously;

the system further comprises compression means for controllably compressing the first information flow during recording;

the control means are means for controlling the compression means depending on the required data rate;

the compression means include a transcoder for additionally compressing, according to predefined compression rules, a first information flow already compressed according to the compression rules;

the control means are means for controlling the scanning velocity depending on the required data rate;

the information carrier is disc-shaped; and the control means are means for selecting the radial position of an area for writing information of the first information flow depending on the required data rate.

9. The system of claim 8 in which the control means are means for controlling the scanning velocity for recording the first information flow depending on the required data rate for simultaneously processing the further information flow.

* * * * *